(12) United States Patent
Patel et al.

(10) Patent No.: US 10,984,111 B2
(45) Date of Patent: Apr. 20, 2021

(54) DATA DRIVEN PARSER SELECTION FOR PARSING EVENT LOGS TO DETECT SECURITY THREATS IN AN ENTERPRISE SYSTEM

(71) Applicant: EMC IP Holding Company LLC, Hopkinton, MA (US)

(72) Inventors: Ahtesham Akhtar Patel, Bangalore (IN); Ratheesh Nair, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 192 days.

(21) Appl. No.: 16/426,338

(22) Filed: May 30, 2019

(65) Prior Publication Data

US 2020/0380136 A1 Dec. 3, 2020

(51) Int. Cl.
*G06F 21/00* (2013.01)
*H04L 29/06* (2006.01)
*G06F 21/57* (2013.01)
*G06F 16/33* (2019.01)
*G06F 16/335* (2019.01)
*G06F 16/17* (2019.01)
*G06F 16/35* (2019.01)
*G06F 16/31* (2019.01)
*G06Q 10/06* (2012.01)
*G06F 40/211* (2020.01)

(52) U.S. Cl.
CPC ........ *G06F 21/577* (2013.01); *G06F 16/1734* (2019.01); *G06F 16/322* (2019.01); *G06F 16/335* (2019.01); *G06F 16/3335* (2019.01); *G06F 16/353* (2019.01); *G06F 40/211* (2020.01); *G06Q 10/0635* (2013.01)

(58) Field of Classification Search
CPC .. G06F 21/577; G06F 40/211; G06F 16/3335; G06F 16/335; G06F 16/1734; G06F 16/353; G06F 16/322; G06F 40/284; G06F 40/279; G06F 40/205; G06F 21/552; G06F 21/554; G06Q 10/0635
See application file for complete search history.

(56) References Cited

U.S. PATENT DOCUMENTS 6,732,153 B1 * 5/2004 Jakobson .............. H04L 41/064
  709/206
7,027,975 B1 * 4/2006 Pazandak ............ G06F 16/3344
  704/9

(Continued)

*Primary Examiner* — Lisa C Lewis
(74) *Attorney, Agent, or Firm* — Ryan, Mason & Lewis, LLP

(57) ABSTRACT

A method includes obtaining an incoming event log, splitting the incoming event log into a set of tokens, and identifying a subset of the tokens as anchor tokens. The method also includes utilizing an ordered list of the anchor tokens to traverse through a set of anchor token trees and, responsive to identifying a path from (i) a root node of a given one of the anchor token trees to (ii) a given leaf node of the given anchor token tree corresponding to the ordered list of the anchor tokens, selecting a given parser associated with the given leaf node. The method further includes extracting data from the incoming event log utilizing the given parser, detecting one or more security threats affecting at least one asset in an enterprise system based on the extracted data, and applying at least one remediation action to mitigate the detected security threats.

20 Claims, 13 Drawing Sheets

(56) References Cited

U.S. PATENT DOCUMENTS

| | | | |
|---|---|---|---|
| 7,437,359 B2 * | 10/2008 | Aguilar-Macias | H04L 67/22 |
| 2005/0080763 A1 | 4/2005 | Opatowski | |
| 2007/0169038 A1 * | 7/2007 | Shankar | G06F 8/427 |
| | | | 717/143 |
| 2007/0226754 A1 * | 9/2007 | Grabarnik | G06F 8/427 |
| | | | 719/313 |
| 2007/0234426 A1 * | 10/2007 | Khanolkar | H04L 63/1408 |
| | | | 726/23 |
| 2011/0125752 A1 * | 5/2011 | Maida-Smith | H04L 63/1408 |
| | | | 707/740 |
| 2011/0239160 A1 | 9/2011 | Kirshenboim et al. | |
| 2014/0372105 A1 * | 12/2014 | Manadhata | G06F 40/205 |
| | | | 704/9 |
| 2018/0165147 A1 * | 6/2018 | Debnath | G06F 11/0766 |

* cited by examiner

301

1 948049487.011923160 ESU_71_appliance events dhcp lease of ip 192.168.128.253 *from* server mac 00:18:0A:41:8F:46 *for* client mac A4:BA:DB:10:0E:80 *from* router 192.168.128.1 *on* subnet 255.255.255.0 *with* dns 192.168.128

303

[948049487.011923160, ESU_71_appliance, dhcp, 192.168.128.253, 00:18:0A:41:8F:46, A4:BA:DB:10:0E:80, 192.168.128.1, 255.255.255.0, dns, 192.168.128, 1, events, lease, server, mac, client, router, subnet]

FIG. 3

```
import nltk
from nltk.tokenize import word_tokenize
from nltk.corpus import stopwords
import re fh = open('ciscomeraki_verify.dev', encoding='utf-8', errors='ignore')
text = fh.read()
tokens = re.split('\s|:|=', text)
fh.close()
clean_tokens = tokens[:]
freq = nltk.FreqDist(clean_tokens)
stop_words = set(stopwords.words('english'))
key_list = list(freq)

print("no of keys: {}".format(len(key_list)))
# Remove stop words from the list
for i, key in enumerate(key_list):
    if key in stop_words:
        del freq[key]
        print(key + ": " + str(i))

# Write the tokens and count to a file
fh = open('./word_freq.txt', 'w')
for key,val in freq.most_common():
    fh.write(str(key) + ":\t" + str(val) + '\n')
fh.close()
```

```
import re

# Define the format of a node here
class Node:
    def __init__(self, value, parent_node):
        self.value = value
        self.parent_node = parent_node
        self.child_nodes_list = []
        self.parser_names = []

# Read anchor tokens from file
with open('tokens') as f:
    anchor_tokens = f.readlines()
anchor_tokens = [x.strip() for x in anchor_tokens]
```

```
# Create a list of lists, where each list represents the anchor tokens in order of occurrence in each test
log mapped to a parser
list_of_tokens_list = []
with open('ciscomeraki_verify.dev', encoding='utf-8', errors='ignore') as f:
    lines = f.readlines()
    lines = [x.strip() for x in lines]

for line in lines:
    tokens = re.split('\s|:|=', line)
    parser_name = tokens.pop(len(tokens)-1)
    temp_tokens = tokens[:]
    for token in temp_tokens:
        if token not in anchor_tokens:
            tokens.remove(token)

tokens.append(parser_name)
    list_of_tokens_list.append(tokens)
```

```
# Create the set of parse trees here
list_of_head_nodes = []
for tokens_list in list_of_tokens_list:
    tree_level = list_of_head_nodes
    parent = None
    parser_name = tokens_list.pop(len(tokens_list)-1 )
    for token in tokens_list:
        found = False
        for node in tree_level:
            if token == node.value:
                tree_level = node.child_nodes_list
                parent = node
                found = True
                break
        if not found:
            node = Node(token, parent)
            tree_level.append(node)
            tree_level = node.child_nodes_list
    node.parser_names.append(parser_name)
```

FIG. 5C

```
def select_parser(log, parse_tree, anchor_tokens_list):
    tokens = re.split('\s|=', log)

useful_tokens = []
    meta_tokes = []

for token in tokens:
        if token in anchor_tokens_list:
            useful_tokens.append(token)
        else:
            meta_tokes.append(token)
    tree_level = parse_tree
    found = False
    last_node = None
    for i, token in enumerate(useful_tokens):
        found = False
        for node in tree_level:
            if node.value == token:
                tree_level = node.child_nodes_list
                last_node = node
                found = True
                break
        if not found:
            print("parser unknown")
            break if found:
        print("parser is {}".format(last_node.parser_names))
```

```
log1 = '1 1491660721.071142502 AP_Reno_2nd_Floor_SW flows allow src=10.101.132.67
dst=10.198.12.171 mac=BC:84:85:95:B9:F1 protocol=tcp sport=63015 dport=443'
log2 = '1 948049487.011923160 ESU_71_appliance events dhcp lease of ip 192.168.128.253 from
server mac 00:18:0A:41:8F:46 for client mac A4:BA:DB:10:0E:80 from router 192.168.128.1 on subnet
255.255.255.0 with dns 192.168.128.1'
log3 = '1506921611,10.8.18.1,,,1 1506921611.085178157 v_plwroc201mx64 security_event
security_filtering_file_scanned
url=http://ctldl.windowsupdate.com/msdownload/update/v3/static/trustedr/en/disallowedcertstl.cab?939
d00583c4c889b src=10.8.18.99:49251 dst=92.122.155:80 mac=60:67:20:75:23:20 name="
sha256=048846ed8ed185a26394adeb3f63274d1029bbd59cffa8e73a4ef8b19456de1d
disposition=malicious action=block'
log4 = '1 1497276507.096509202 MXAMOA4KK01M01 events dhcp no offers for mac
F2:80:79:BF:00:01' select_parser(log1, list_of_head_nodes, anchor_tokens_list=anchor_tokens)
select_parser(log2, list_of_head_nodes, anchor_tokens_list=anchor_tokens)
select_parser(log3, list_of_head_nodes, anchor_tokens_list=anchor_tokens)
select_parser(log4, list_of_head_nodes, anchor_tokens_list=anchor_tokens)
```

FIG. 8B

DATA DRIVEN PARSER SELECTION FOR PARSING EVENT LOGS TO DETECT SECURITY THREATS IN AN ENTERPRISE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information security, and more particularly to detection of security threats in enterprise systems.

BACKGROUND

Various entities are subject to different types of security threats. Some security threats relate to networking and computer security for an enterprise system. Software and hardware devices in an enterprise system may generate event logs that are analyzed to detect potential security threats. To do so, each event log may be matched against a set of parsers, where each parser is an expression or pattern that matches a particular type of event. As the number and types of devices generating event logs in an enterprise system increases, the task of generating and selecting parsers for handling different patterns in the event logs presents various challenges.

SUMMARY

Illustrative embodiments of the present invention provide techniques for parsing event logs to address security threats in an enterprise system. Embodiments advantageously improve the security of enterprise systems through increasing the speed and efficiency with which event logs are processed.

In one embodiment, a method comprises obtaining an incoming event log associated with one or more of a plurality of assets in an enterprise system, splitting the incoming event log into a set of tokens, and identifying a subset of the set of tokens of the incoming event log as anchor tokens. The method also comprises utilizing an ordered list of the anchor tokens of the incoming event log to traverse through a set of anchor token trees and, responsive to identifying a path from (i) a root node of a given one of the anchor token trees to (ii) a given leaf node of the given anchor token tree corresponding to the ordered list of the anchor tokens of the incoming event log, selecting a given parser associated with the given leaf node of the given anchor token tree. The method further comprises extracting data from the incoming event log utilizing the given parser, detecting one or more security threats affecting at least one of the plurality of assets in the enterprise system based at least in part on the extracted data, and applying at least one remediation action to one or more of the plurality of assets in the enterprise system to mitigate at least one of the detected security threats. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

BRIEF DESCRIPTION OF THE DRAWINGS

FIG. 3 illustrates tokenization of an event log in an illustrative embodiment.

FIG. 4 illustrates pseudocode for selecting anchor tokens in an illustrative embodiment.

FIGS. 5A-5C illustrate pseudocode for generating anchor token trees in an illustrative embodiment.

FIGS. 8A and 8B illustrate pseudocode for parser selection in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

As the number of assets in an enterprise system grows, it is increasingly difficult to monitor and detect security threats in the enterprise system. A security information and event management (SIEM) system may use a set of parsers for efficient data extraction and taxonomy of extracted values from security events detected or generated by assets in an enterprise system being monitored for security threats. Parser selection, however, is a non-trivial task that can be time-consuming and resource-intensive (e.g., consuming significant amounts of central processing unit (CPU) or other compute, network and storage resources). Illustrative embodiments utilize a data-driven model that improves the process of parser selection, allowing a SIEM system or other type of threat detection and remediation system that monitors an enterprise system to handle more events per second (EPS) and thereby improve overall performance.

Figure 1:
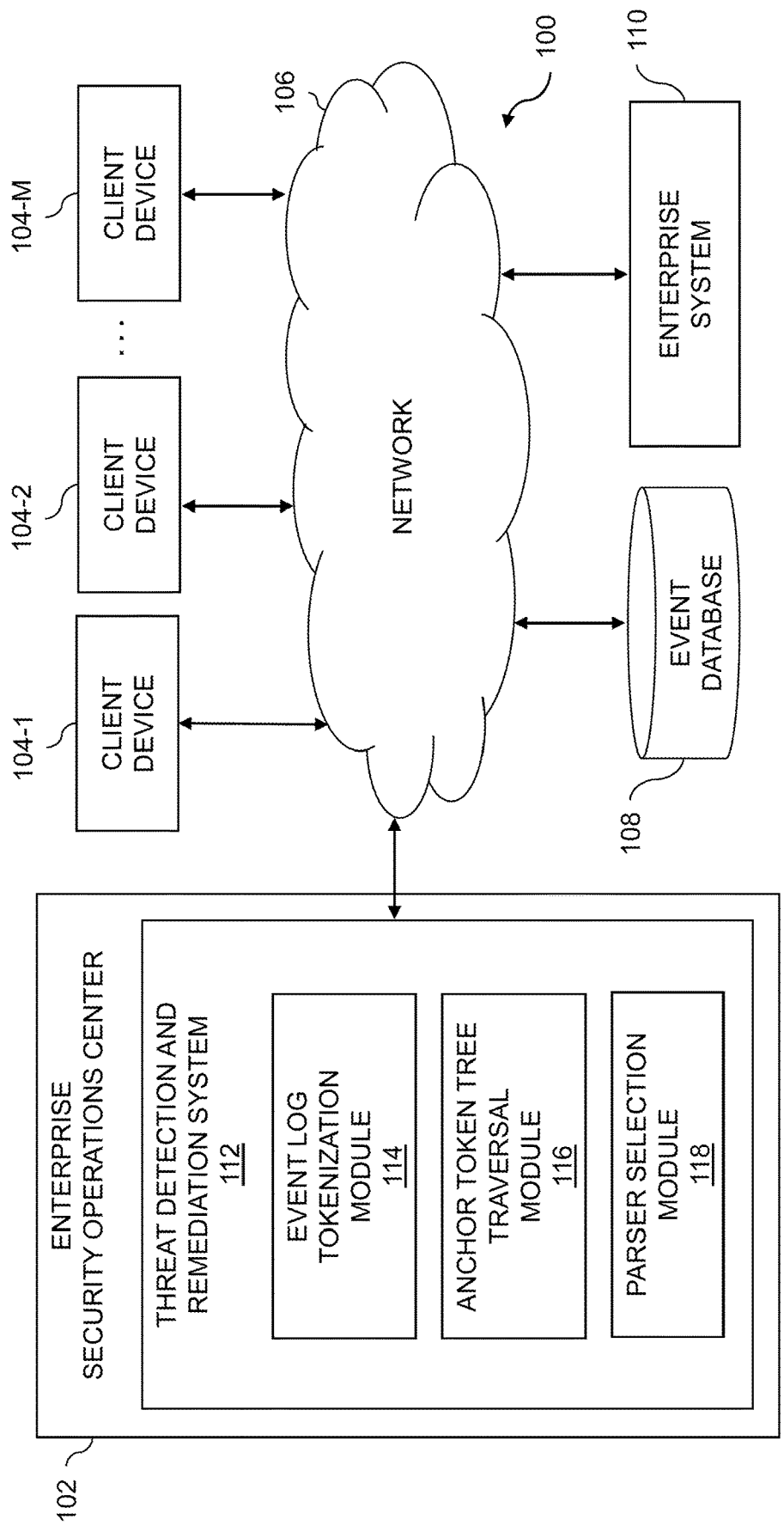
FIG. 1 is a block diagram of an information processing system for parsing event logs to detect security threats in an enterprise system in an illustrative embodiment of the invention.

FIG. 1 shows an information processing system 100 configured in accordance with an illustrative embodiment. The information processing system 100 is assumed to be built on at least one processing platform and provides functionality for parsing event logs to detect security threats in an enterprise system 110. The assets may include, by way of example, physical and virtual computing resources in the enterprise system 110. Physical computing resources may include physical hardware such as servers, storage systems, networking equipment, Internet of Things (IoT) devices, other types of processing and computing devices, etc. Virtual computing resources may include virtual machines (VMs), containers, etc.

In this embodiment, the system 100 more particularly comprises an enterprise security operations center (SOC) 102 and a plurality of client devices 104-1, 104-2, . . . 104-M, collectively referred to herein as client devices 104. The client devices 104 are coupled to a network 106. Also coupled to the network 106 is a event database 108, which may store various information relating to events in the enterprise system 110 (e.g., security events) as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The event database 108, as discussed above, is configured to store and record information relating to monitored events in the enterprise system 110. Such information may include a collection of event logs, a set of potential anchor tokens, a set of anchor token trees, etc.

The event database 108 in some embodiments is implemented using one or more storage systems or devices associated with the enterprise SOC 102. In some embodiments, one or more of the storage systems utilized to implement the event database 108 comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement a storage system in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

The client devices 104 are configured to access or otherwise utilize an enterprise system 110. The enterprise system 110 may represent an information technology (IT) infrastructure comprising a plurality of assets (e.g., physical or virtual computing resources) of a business, entity or other enterprise.

In the present embodiment, alerts or notifications generated by a threat detection and remediation system 112 of the enterprise SOC 102 are provided over network 106 to client devices 104, or to a system administrator, IT manager, or other authorized personnel via one or more security or host agents. Such security or host agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 106 with the enterprise SOC 102 and the threat detection and remediation system 112. For example, a given security or host agent may comprise a mobile telephone equipped with a mobile application configured to receive alerts from the enterprise SOC 102 or the threat detection and remediation system 112 and to provide an interface for the security agent to select particular remediation measures for responding to the alert or notification. Examples of such remediation measures may include blocking access by one or more of the client devices 104 to assets of the enterprise system 110, requiring user input or authentication by the client devices 104 to obtain information from or otherwise utilize one or more assets of the enterprise system 110, triggering further review of the enterprise system 110 or assets thereof, etc. Remediation measures may also include applying security hardening procedures to assets of the enterprise system 110, establishing new or modified monitoring of assets of the enterprise system 110, changing or adjusting the configuration of assets of the enterprise system 110, etc.

It should be noted that a "security agent" or "host agent" as these terms are generally used herein may comprise an automated entity, such as a software entity running on a processing device. Accordingly, a security agent or host agent need not be a human entity.

As shown in FIG. 1, the enterprise SOC 102 comprises threat detection and remediation system 112. As will be described in further detail below, the threat detection and remediation system 112 is configured to parse event logs to detect security threats in the enterprise system 110.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 106. In some embodiments, the threat detection and remediation system 112 may be implemented at least in part within one or more of the client devices 104.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112. In the FIG. 1 embodiment, the threat detection and remediation system 112 comprises an event log tokenization module 114, an anchor token tree traversal module 116, and a parser selection module 118.

The event log tokenization module 114 is configured to obtain incoming event logs associated with one or more of a plurality of assets in the enterprise system 110. The event log tokenization module 114 is also configured to split the incoming event logs into sets of tokens, and to identify subsets of the sets of tokens of the incoming event logs as anchor tokens for the incoming event logs.

The anchor token tree traversal module 116 is configured to utilize ordered lists of the anchor tokens of the incoming event logs to traverse through a set of anchor token trees. Each anchor token tree has a root node corresponding to one of a set of potential anchor tokens, along with paths or branches from the root node to leaf nodes corresponding to parsers. Each path from the root node to a leaf node may include one or more intermediate nodes at different levels of the anchor token tree.

The parser selection module 118 is configured, responsive to identifying a path from (i) a root node of a given one of the anchor token trees to (ii) a given leaf node of the given anchor token tree corresponding to the ordered list of the anchor tokens of a given incoming event log, to select a given parser associated with the given leaf node of the given anchor token tree for the given incoming event log. The threat detection and remediation system 112 is configured to extract data from the given incoming event log utilizing the given parser, to detect one or more security threats affecting at least one of the plurality of assets in the enterprise system 110 based at least in part on the extracted data, and to apply at least one remediation action to one or more of the plurality of assets in the enterprise system 110 to mitigate at least one of the detected security threats.

It is to be appreciated that the particular arrangement of the enterprise SOC 102, the threat detection and remediation system 112, the event log tokenization module 114, the anchor token tree traversal module 116, and the parser selection module 118 illustrated in the FIG. 1 embodiment is presented by way of example only, and alternative arrangements can be used in other embodiments. As discussed above, for example, the enterprise SOC 102, the threat detection and remediation system 112, the event log tokenization module 114, the anchor token tree traversal module 116, and the parser selection module 118 may in some embodiments be implemented internal to one or more of the client devices 104. As another example, the functionality associated with the event log tokenization module 114, the anchor token tree traversal module 116, and the parser selection module 118 may be combined into one module, or separated across more than three modules with the multiple modules possibly being implemented with multiple distinct processors or processing devices.

At least portions of the event log tokenization module 114, the anchor token tree traversal module 116, and the parser selection module 118 may be implemented at least in part in the form of software that is stored in memory and executed by a processor.

It is to be understood that the particular set of elements shown in FIG. 1 for parsing event logs to detect security threats in the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a SIEM system such as the RSA NetWitness® Platform Evolved SIEM from Dell EMC, a critical incident response center (CIRC), a security analytics system, a Governance, Risk and Compliance (GRC) system, etc.

The threat detection and remediation system 112 and other portions of the system 100, as will be described in further detail below, may be part of cloud infrastructure such as an Amazon Web Services (AWS) system. Other examples of cloud-based systems that can be used to provide the threat detection and remediation system 112 include Virtustream Enterprise Cloud, Virtustream Storage Cloud, Google Cloud Platform (GCP) and Microsoft Azure.

The threat detection and remediation system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and threat detection and remediation system 112 or components thereof (e.g., the event log tokenization module 114, the anchor token tree traversal module 116, and the parser selection module 118) may be implemented on respective distinct processing platforms, although numerous other arrangements are possible. For example, in some embodiments at least portions of the threat detection and remediation system 112 and one or more of the client devices 104 are implemented on the same processing platform. A given client device (e.g., 104-1) can therefore be implemented at least in part within at least one processing platform that implements at least a portion of the threat detection and remediation system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, threat detection and remediation system 112 or portions or components thereof, to reside in different data centers. Numerous other distributed implementations are possible. The threat detection and remediation system 112 can also be implemented in a distributed manner across multiple data centers.

Additional examples of processing platforms utilized to implement threat detection and remediation system 112 in illustrative embodiments will be described in more detail below in conjunction with FIGS. 9 and 10.

It is to be appreciated that these and other features of illustrative embodiments are presented by way of example only, and should not be construed as limiting in any way.

Figure 2:
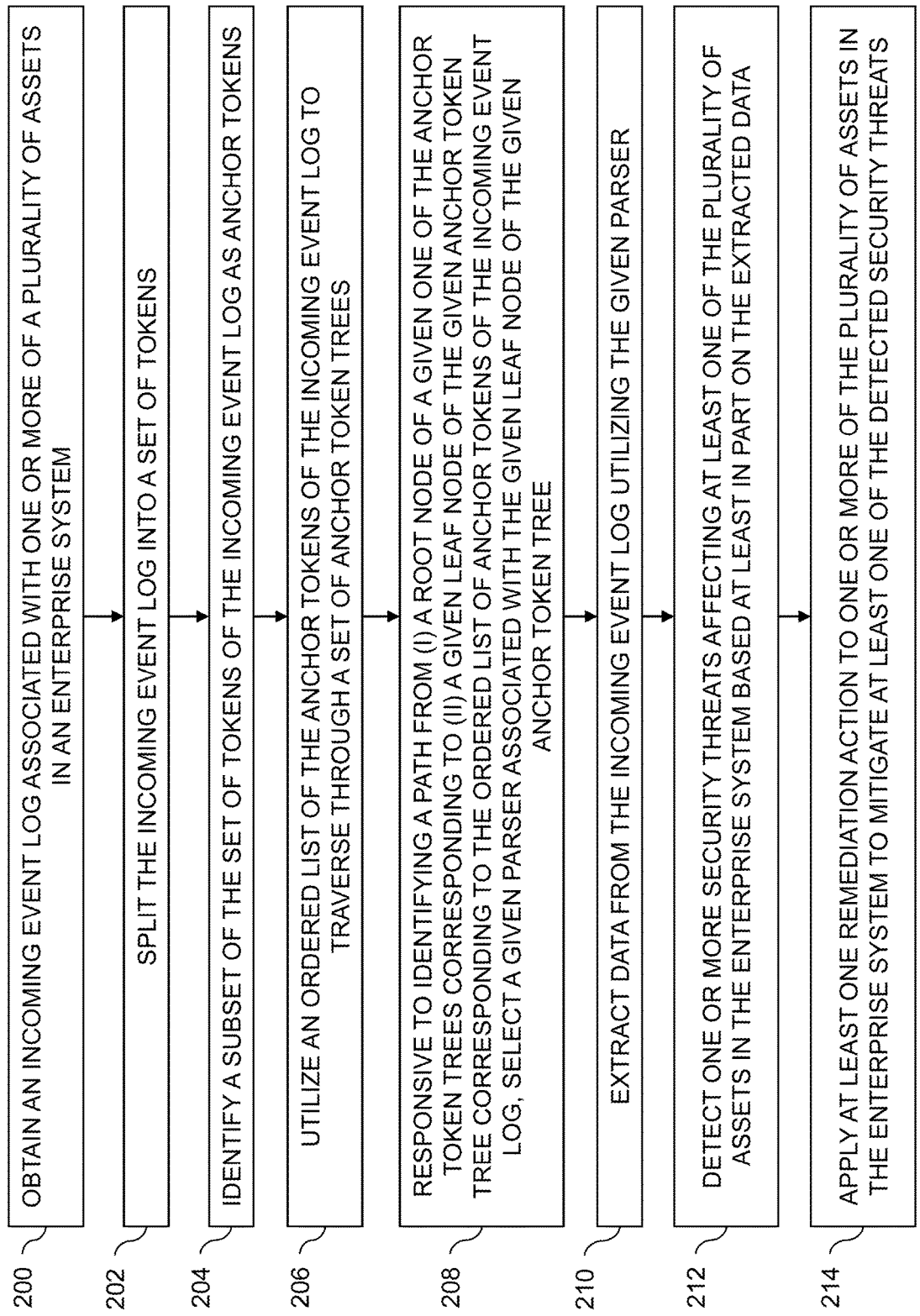
FIG. 2 is a flow diagram of an exemplary process for parsing event logs to detect security threats in an enterprise system in an illustrative embodiment.

An exemplary process for parsing event logs to detect security threats in an enterprise system will now be described in more detail with reference to the flow diagram of FIG. 2. It is to be understood that this particular process is only an example, and that additional or alternative processes for parsing event logs to detect security threats in an enterprise system in other embodiments.

In this embodiment, the process includes steps 200 through 214. These steps are assumed to be performed by the threat detection and remediation system 112 utilizing the event log tokenization module 114, anchor token tree traversal module 116, and parser selection module 118. The process begins with step 200, obtaining an incoming event log associated with one or more of a plurality of assets in an enterprise system. The enterprise system may comprise IT infrastructure of an enterprise, including but not limited to physical infrastructure such as a data center, combinations of physical and virtual infrastructure such as a software-defined data center, a cloud computing infrastructure, etc. The plurality of assets may comprise physical or virtual computing resources, such as servers, storage systems, virtual machines, containers, etc.

The process continues with step 202, splitting the incoming event log into a set of tokens. Step 202 may include separating text of the incoming event log based on one or more pre-defined delimiters, removing one or more textual strings corresponding to a designated set of stop words, and classifying each of the remaining textual strings as one of a string literal token and a variable token.

In step 204, a subset of the set of tokens of the incoming event log are selected as anchor tokens. Step 204 may include selecting textual strings classified as string literal tokens that match textual strings in a list of potential anchor tokens as the anchor tokens for the incoming event log. The list of potential anchor tokens may be generated by tokenizing a collection of event logs to identify a plurality of tokens, removing ones of the plurality of tokens corresponding to pre-defined stop words, creating a frequency distribution of the plurality of tokens, and generating the list of potential anchor tokens by extracting a subset of the plurality of tokens based at least in part on frequencies of occurrence of the plurality of tokens in the frequency distribution.

The variable tokens of an incoming event log may be labeled with meta values by passing the textual strings of the variable tokens through a pattern matching filter for a set of pre-defined token types. The pre-defined token types may include one or more of an Internet Protocol (IP) address, a username, an email address, a date, an event category, a media access control (MAC) address, a uniform resource identifier (URI) path and a file system path.

In step 206, an ordered list of the anchor tokens of the incoming event log is utilized to traverse through a set of anchor token trees. Responsive to identifying a path from (i) a root node of a given one of the anchor token trees to (ii) a given leaf node of the given anchor token tree, a given parser associated with the given leaf node of the given anchor token tree is selected in step 208.

Step 206 may include matching a first anchor token in the ordered list of anchor tokens of the incoming event log to the given root node of the given anchor token tree and matching, in order, subsequent tokens in the ordered list of anchor tokens of the incoming security event log along a branch of the given anchor token tree until a last anchor token in the ordered list of anchor tokens matches the given leaf node of the given anchor token tree.

Responsive to failing to identify a root node of any of the set of anchor token trees matching a first anchor token in the ordered list of anchor tokens of the incoming security event log, steps 206 and 208 may include selecting the given parser by comparing the incoming security event log against a plurality of available parsers not represented by a path from a root node to a leaf node of one of the set of available anchor token trees until a match is found between the set of tokens of the incoming security event log and a pattern of one of the plurality of parsers. A new anchor token tree is then created, the new anchor token tree comprising a new root node and a path from the new root node to a new leaf node corresponding to the given parser.

Responsive to matching a first anchor token in the ordered list of anchor tokens of the incoming security event log but failing to identify a leaf node of the given anchor token tree corresponding to a last anchor token in the ordered list of anchor tokens of incoming event log, steps 206 and 208 may include selecting the given parser by comparing the incoming security event log against a plurality of available parsers not represented by a path from a root node to a leaf node of one of the set of available anchor token trees until a match is found between the set of tokens of the incoming security event log and a pattern of one of the plurality of parsers. A new branch of the given anchor token tree is then created, the new branch comprising a path from the given root node to a new leaf node corresponding to the given parser.

In some embodiments, the set of anchor token trees is generated by analyzing a collection of event logs. This may include extracting, in order of occurrence, anchor tokens in each of the event logs of the collection. For a given event log of the collection, an anchor token tree is selected. Selecting the anchor token tree may comprise, if an anchor token tree is available with a root node corresponding to a first anchor token in the given event log, selecting that anchor token tree and moving to a next level of that anchor token tree. Selecting the anchor token tree may alternatively comprise, if an anchor token tree is not available with a root node corresponding to the first anchor token in the given event log, creating a new anchor token tree with a root node having a value of the first anchor token in the given event log and moving to a next level of the new anchor token tree. For subsequent anchor tokens in the given event log, a current level of the selected anchor token tree is searched. If a node in the current level of the selected anchor token tree is present with a same value as the subsequent anchor token, the process moves to a next level of the selected anchor token tree (unless the subsequent anchor token is the last anchor token of the given event log, in which case the current node is set as a leaf node corresponding to a parser). If a node in the current level of the selected anchor token tree is not present with the same value as the subsequent anchor token, a new node with the same value as the subsequent anchor token is created and the process moves to a next level of the selected anchor token tree (unless the subsequent anchor token is the last anchor token of the given event log, in which case the current node is set as a leaf node corresponding to a parser).

The process continues with step 210, extracting data from the incoming event log utilizing the given parser. The extracted data is used in step 212 to detect one or more security threats affecting at least one of the plurality of assets in the enterprise system. Step 212 may be based on various other information, such as information from multiple event logs or other sources monitoring the enterprise system. In step 214, at least one remediation action is applied to one or more of the plurality of assets in the enterprise system to mitigate at least one of the detected security threats. Remediation actions include, but are not limited to, applying security hardening procedures to one or more of the assets. Security hardening procedures may include applying patches to mitigate vulnerabilities, installing new or updated security software on assets, placing assets behind firewalls, adding additional authentication mechanisms for accessing assets, blocking access by client devices to assets, or blocking or modifying access or communication between assets of the enterprise system, etc.

As discussed above, a STEM system may match security events or event logs against a set of parsers, where each parser is associated with an expression or pattern that fully matches a corresponding type of security event. The parsers may be sorted based on a confidence scoring, with incoming security event logs compared against the set of parsers until an exact match is found. This process of parser selection, however, can be CPU-intensive and time consuming, affecting the number of events that the STEM is able to process (e.g., the EPS).

Illustrative embodiments provide a data-driven solution that increases the efficiency of parser selection, thereby improving overall performance of a STEM system by allowing the SIEM system to process more security events or event logs in a designated period of time, and reducing the CPU or other compute, network and storage resources needed for parser selection.

In some embodiments, parser selection includes anchor token selection, generation of anchor token trees, and parser selection using anchor tokens and anchor token trees. During anchor token selection, a set of tokens are selected from a large set of log data to use as anchor tokens for parser selection. During generation of anchor token trees, one or more N-ary trees are created for holding anchor tokens for use in selecting a parser for a security event or other event log, also referred to below as a "security event log". During parser selection, an appropriate parser is selected for an incoming security event log utilizing the anchor tokens and anchor token trees. It should be appreciated that the processes of anchor token selection and anchor token tree generation may be executed only once initially but may be repeated as desired (e.g., periodically, on detecting that a threshold number of new security event logs or other information is available, etc.). The process of parser selection may be performed each time a security event log is received.

Tokenization, or token selection, is the process of splitting a security event or other event log into tokens using predefined delimiters. FIG. 3 shows an example of a security event log 301, along with a list of tokens 303 that are generated by tokenizing the security event log 301. In FIG. 3, the "string literals" of the security event log 301 are in bold and the "stop" words are in italics. The string literals are tokens that will not be labeled, as compared with variable tokens (shown in FIG. 3 in plain text) that will be labeled with a meta value. For example, the variable token "dhcp" may be labeled as "protocol" and the variable token "00:19:0A:41:8F:46" may be labeled as "mac.addr" (e.g., a MAC address). The stop words are a set of words that do not add meaning to the security event log 301. In FIG. 3, English stop words such as of, from, on, etc. are removed from the list of tokens. The security event log 301 may be run through an analyzer that removes the stop words and splits the security event log 301 into the list of tokens 303.

Anchor token selection, in some embodiments, is performed using a frequency distribution methodology. For example, a subset of the string literals may be picked as anchor tokens. To select the anchor tokens, a varied set of security event logs is collected and each of the security event logs is then tokenized as described above to remove any stop word tokens. A frequency distribution of the remaining tokens is created, with the tokens being sorted based on frequency of occurrence. The top n tokens are then extracted for use as anchor tokens. If a sufficiently large and varied data set is collected, then the variable tokens will tend to percolate to the bottom of the sorted frequency distribution list and the top n tokens will be representative of the optimal set of values to be used as anchor tokens. The value of n may be user-defined as desired (e.g., based on trial and error for a particular data set of security event logs) for a particular implementation. In some embodiments, the n tokens may be manually analyzed to weed out any values that are determined not to be valid (e.g., not useful in event parsing) as anchor tokens. FIG. 4 shows pseudocode 400 for creating a list of anchor tokens from a set of security event logs. The pseudocode 400 is written in Python, but it should be appreciated that various other programming languages may be used as desired.

After anchor token selection, anchor token trees may be generated. For a given security event log corresponding to a given parser, the anchor tokens in the given security event log are extracted in order of occurrence. The first token of the given security event log is then compared against a set of existing anchor token trees. If a given one of the existing anchor token trees is present with the first token of the given security event log as its root node, the process moves to the next level of the given existing anchor token tree. If there is no existing anchor token tree with the first token of the given security event log as its root node, a new anchor token tree is created with its root node having the value of the first token and the process moves to the next level of the new anchor token tree. For the second token of the given security event log onwards, nodes of a current level of the selected anchor token tree are searched. If a given node is present with the same token value, the process moves on to the next level from the given node. If no node is present with the same token value, a new node is created with the token value and the process moves to a next level off the newly-created node. FIGS. 5A-5C show pseudocode 500-1, 500-2 and 500-3, respectively (collectively, pseudocode 500) for generating anchor token trees. The pseudocode 500, similar to the pseudocode 400, is written in Python although this is not a requirement and various other programming languages may be used as desired.

Figure 6:
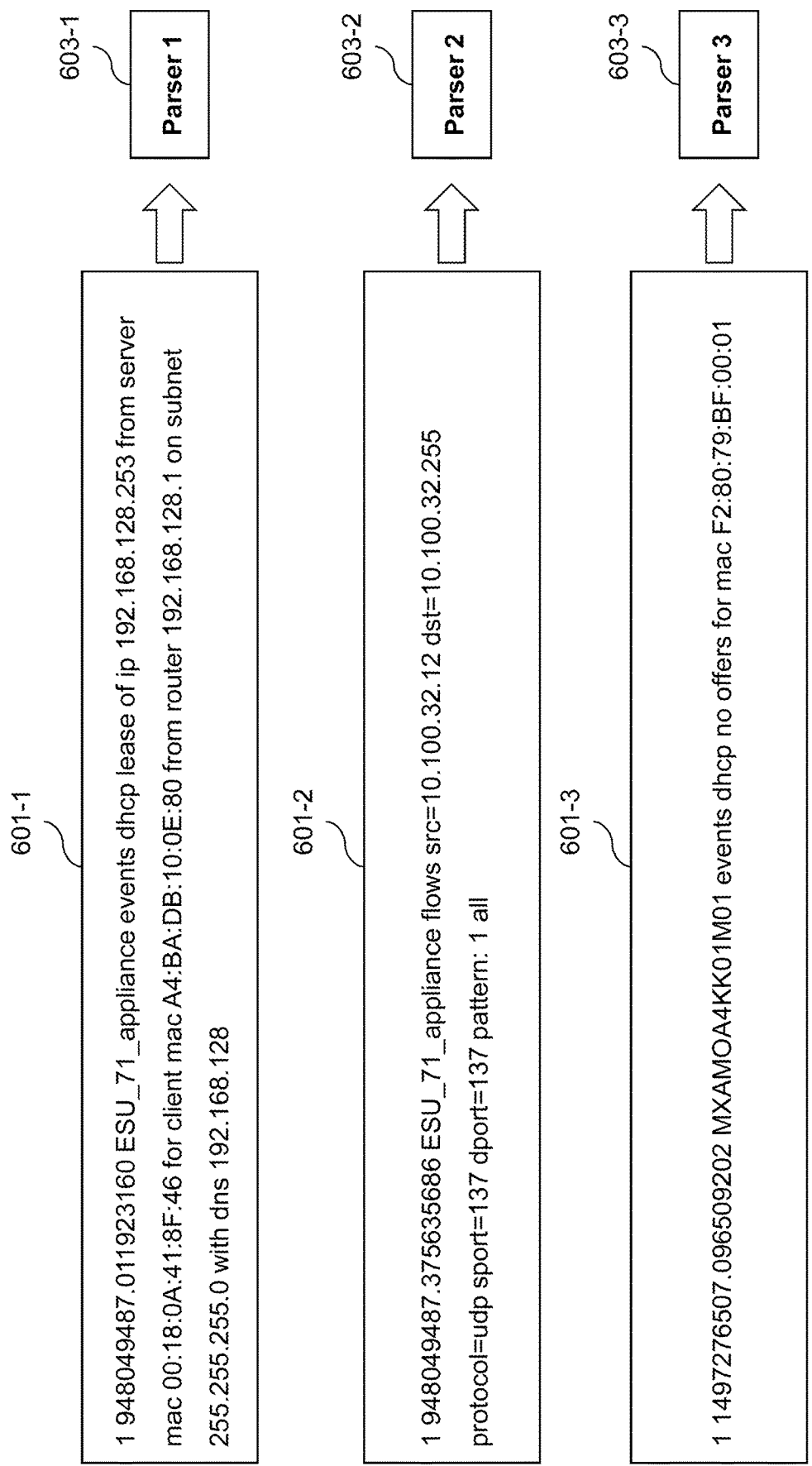
FIG. 6 illustrates a set of event logs corresponding to different parsers in an illustrative embodiment.
Figure 7:
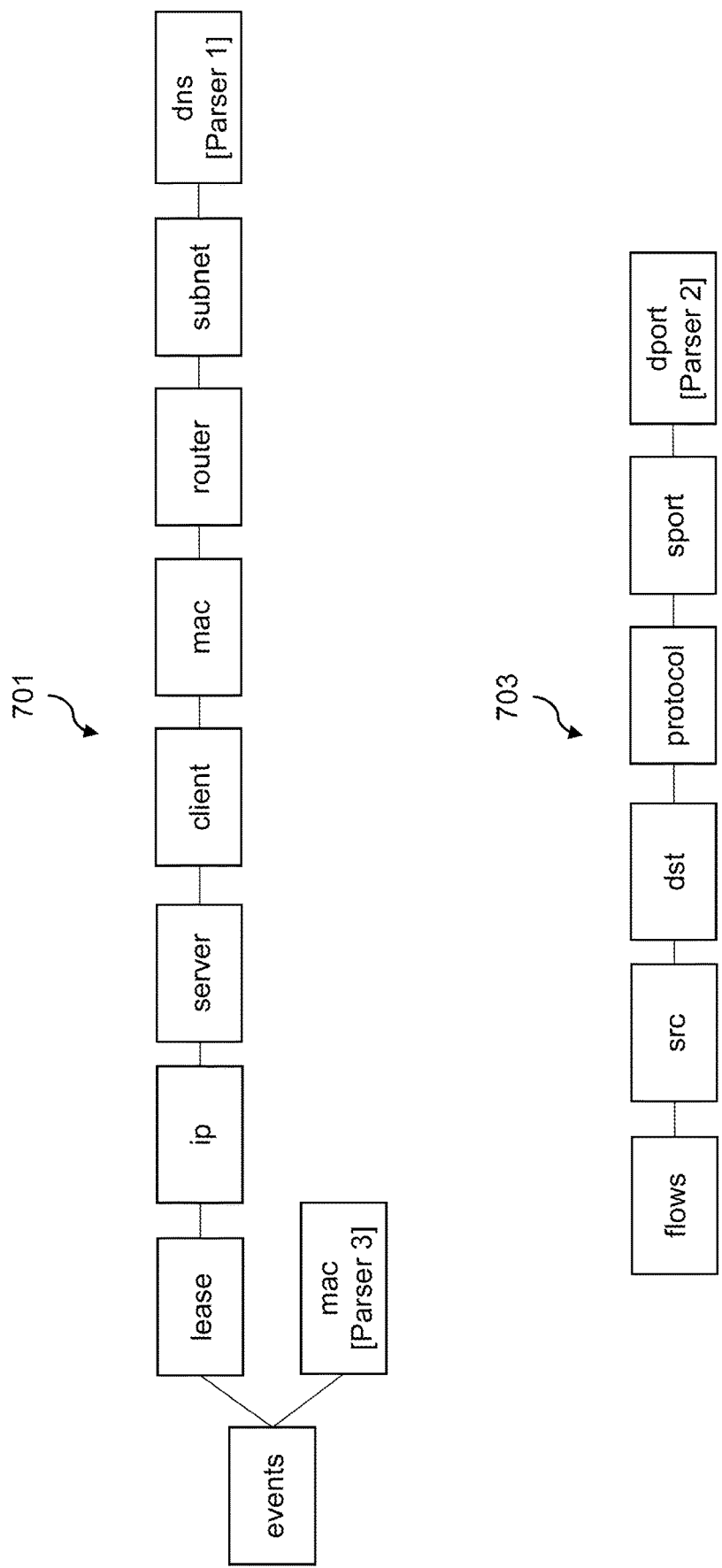
FIG. 7 illustrates anchor token trees created for the set of event logs of FIG. 6 in an illustrative embodiment.

FIG. 6 shows security event logs 601-1, 601-2 and 601-3 (collectively, security event logs 601) corresponding to parsers 603-1, 603-2 and 603-3 (collectively, parsers 603), respectively. FIG. 7 shows anchor token trees 701 and 703 created from the security event logs 601 shown in FIG. 6 utilizing the pseudocode 500 of FIG. 5 and a set of anchor tokens including: {src, dst, events, mac, protocol, signature, priority, timestamp, flows, ids-alerts, direction, ingress, message, server, client, sport, dport, allow, url, dhost, MAC, lease, urls, dns, subnet, router}. The leaf nodes of each branch of the anchor token trees 701 and 703 indicate the parser selected for a particular security event log.

Security event log 601-1 is analyzed, and its first anchor token "events" corresponds to the root node of anchor token tree 701. The next anchor token "lease" of security event log 601-1 corresponds to the next node in the first or top branch of the anchor token tree 701. Subsequent anchor tokens of the security event log 601-1 such as "ip", "server", "client", "mac", "router" and "subnet" all continue along the first or top branch of the anchor token tree 701 until reaching the leaf node "dns" corresponding to Parser 1 603-1.

Security event log 601-2 is analyzed, and its first anchor token "flows" corresponds to the root node of anchor token tree 703. The next anchor token "src" of the security event log 601-2 corresponds to the next node in the anchor token tree 703. Subsequent anchor tokens of the security event log 601-2 such as "dst", "protocol" and "sport" all continue along the anchor token tree 703 until reaching the leaf node "dport" corresponding to Parser 2 603-2.

Security event log 601-3 is analyzed, and its first anchor token "events" corresponds to the root node of anchor token tree 701. The next anchor token "mac" of the security event log 601-3 corresponds to the second or bottom branch of the anchor token tree 701 (rather than the first or top branch of the anchor token tree 701 as in security event log 601-1). In this instance, the anchor token "mac" is also the leaf node of the second or bottom branch of the anchor token tree 701 corresponding to Parser 3 603-3.

Parser selection for incoming security event logs may proceed as follows. A given incoming security event log is broken down into anchor tokens and variable tokens. The anchor tokens and variable tokens of the given incoming security event log may be maintained in different lists or other data structures. The anchor tokens of the given incoming security event log are then used to traverse through a set of available anchor token trees to find a parser for the given incoming security event log. This traversal may result in one of the four scenarios described below.

In a first scenario, the anchor tokens of the given incoming security event log (e.g., maintained in an anchor token list or other data structure) are iterated through in order and are found to be present on a set of nodes of one of the available anchor token trees ending with a leaf node that has a parser linked to it. In this case, the given incoming security event log is parsed using the selected parser corresponding to the leaf node.

In a second scenario, the anchor tokens of the given incoming security event log do not match a traversal path through any of the available set of anchor token trees. In this case, the parser for the given incoming security event log is unknown and a traditional method of parser selection is used.

In a third scenario, the anchor tokens of the given incoming security event log are utilized for partial traversal through a branch of one of the available token trees but the traversal is not complete. In other words, the anchor tokens of the given incoming security event log may be used to partially traverse a given one of the available anchor token trees until one of the anchor tokens of the given incoming security event log fails to match a next node of one of the branches of the given available anchor token tree. In this case, the parser for the given incoming security event log is again unknown and a traditional method of parser selection is used.

For both the second and third scenarios, once a parser is identified using the traditional method, the set of available anchor token trees may be updated in an automated fashion. Thus, in some embodiments techniques for parser selection are self-learning and the next time an incoming security event log with a similar set of anchor tokens is received, that incoming security event log would be captured under the first scenario.

In a fourth scenario, meta values for the variable tokens in the given incoming security event log are generated by inspecting the variable token values in the variable token list or other data structure to find patterns (e.g., an IP address, a username, a data, a MAC address, a universally unique identifier (UUID), etc.). In a case where no parser is found using the traditional method under the second or third scenario, the variable token list can be used to assign labels to data by passing the variable tokens through a pattern matching filter. In some embodiments, a list of patterns may be maintained representing certain types of variables (e.g., usernames, emails, dates in different forms, event categories, numbers, MAC addresses, Cisco MAC addresses, Windows MAC addresses, URI paths, file system paths, etc.). Such patterns may represent an ever-growing list as new and varied security event logs with new variable tokens are encountered. The variable token list of the given incoming security event log may be run through pattern matches to pull out the types for the variable tokens, and meta names (e.g., labels such as "IP address", "email", "username", "MAC", etc.) may be assigned to the variable tokens.

FIGS. 8A and 8B illustrate pseudocode 800-1 and 800-2 (collectively, pseudocode 800) for parser selection. The pseudocode 800, similar to pseudocode 400 and pseudocode 500, is written in Python but this is not a requirement and various other programming languages may be used.

Illustrative embodiments provide various advantages relative to conventional techniques. For example, the parser selection techniques described herein may improve the EPS rate of a SIEM system, such as RSA NetWitness® available from Dell EMC. Handling a higher EPS is a major hurdle for SIEM system. A 10% improvement in EPS, for example, allows for lowering the number of appliances (e.g., physical and virtual computing resources) used for event parsing. This frees up resources for additional tasks such as implementing remediation actions on detecting security threats from the security event logs. Improved parsing and labeling of data from security event logs using the techniques described herein may also provide improvements in data analytics.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for parsing event logs to detect security threats in an enterprise system will now be described in greater detail with reference to FIGS. 9 and 10. Although described in the context of system 100, these platforms may also be used to implement at least portions of other information processing systems in other embodiments.

Figure 9:
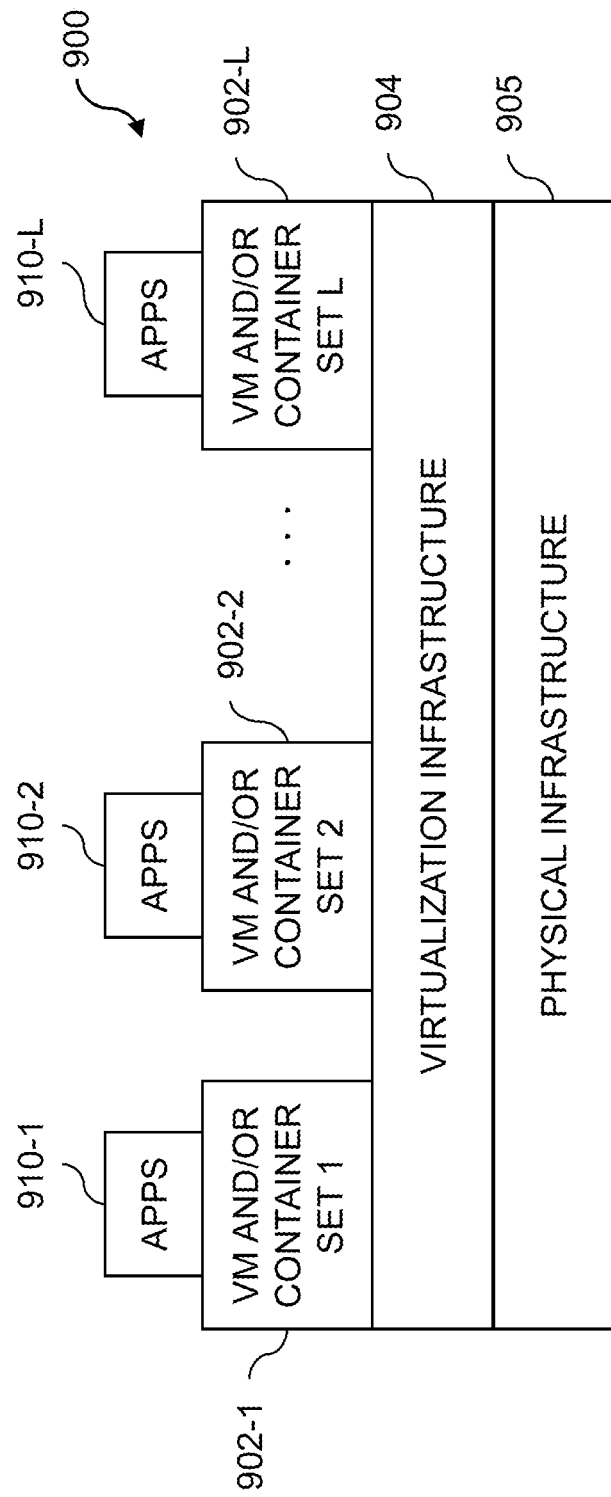
FIGS. 9 and 10 show examples of processing platforms that may be utilized to implement at least a portion of an information processing system in illustrative embodiments.
Figure 10:
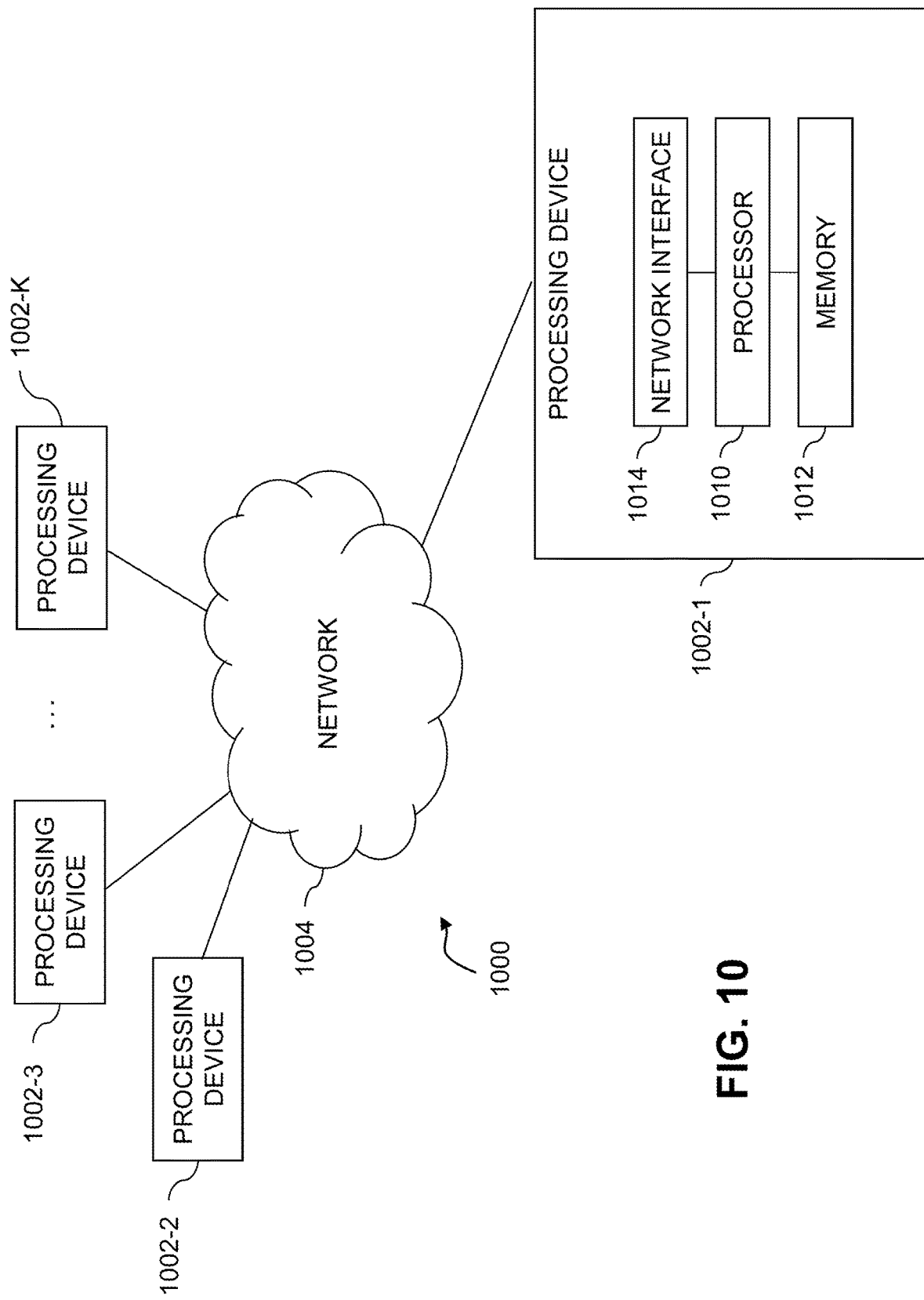

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, ... 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, ... 910-L running on respective ones of the VMs/container sets 902-1, 902-2, ... 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, ... 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for parsing event logs to detect security threats in an enterprise system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, parsers, anchor tokens, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   obtaining an incoming event log associated with one or more of a plurality of assets in an enterprise system;
   splitting the incoming event log into a set of tokens;
   identifying a subset of the set of tokens of the incoming event log as anchor tokens;
   utilizing an ordered list of the anchor tokens of the incoming event log to traverse through a set of anchor token trees;
   responsive to identifying a path from (i) a root node of a given one of the anchor token trees to (ii) a given leaf node of the given anchor token tree corresponding to the ordered list of the anchor tokens of the incoming event log, selecting a given parser associated with the given leaf node of the given anchor token tree;
   extracting data from the incoming event log utilizing the given parser;
   detecting one or more security threats affecting at least one of the plurality of assets in the enterprise system based at least in part on the extracted data; and
   applying at least one remediation action to one or more of the plurality of assets in the enterprise system to mitigate at least one of the detected security threats;
   wherein the method is performed by at least one processing device comprising a processor coupled to a memory.

2. The method of claim 1 wherein splitting the incoming event log into the set of tokens comprises:
   separating text of the incoming event log based on one or more pre-defined delimiters;
   removing one or more textual strings corresponding to a designated set of stop words; and
   classifying each of the remaining textual strings as one of a string literal token and a variable token.

3. The method of claim 2 wherein identifying a subset of the set of tokens as anchor tokens comprises selecting textual strings classified as string literal tokens that match textual strings in a list of potential anchor tokens as the anchor tokens for the incoming event log.

4. The method of claim 3 further comprising:
   tokenizing a collection of event logs to identify a plurality of tokens;
   removing ones of the plurality of tokens corresponding to pre-defined stop words;
   creating a frequency distribution of the plurality of tokens; and
   generating the list of potential anchor tokens by extracting a subset of the plurality of tokens based at least in part on frequencies of occurrence of the plurality of tokens in the frequency distribution.

5. The method of claim 2 further comprising labeling a given one of the variable tokens with a given meta value by passing the textual string of the given variable token through a pattern matching filter for a set of pre-defined token types.

6. The method of claim 5 wherein the set of pre-defined token types comprise at least one of an Internet Protocol (IP) address, a username, an email address, a date, an event category, a media access control (MAC) address, a uniform resource identifier (URI) path and a file system path.

7. The method of claim 1 further comprising analyzing a collection of event logs to generate the set of anchor token trees, wherein generating the set of anchor token trees comprises:
   extracting, in order of occurrence, anchor tokens in a given one of the event logs of the collection;
   selecting an anchor token tree, wherein selecting the anchor token tree comprises:
      if an anchor token tree is available with a root node corresponding to a first anchor token in the given event log, selecting that anchor token tree and moving to a next level of that anchor token tree; and
      if an anchor token tree is not available with a root node corresponding to the first anchor token in the given event log, creating a new anchor token tree with a root node having a value of the first anchor token in the given event log and moving to a next level of the new anchor token tree;
   for subsequent anchor tokens in the given event log:
      searching a current level of the selected anchor token tree;
      if a node in the current level of the selected anchor token tree is present with a same value as the subsequent anchor token, moving to a next level of the selected anchor token tree or, if the subsequent anchor token is a last anchor token in the given event log, setting the node in the current level of the selected anchor token tree as a leaf node corresponding to a parser for the given event log; and
      if a node in the current level of the selected anchor token tree is not present with the same value as the subsequent anchor token, creating a new node with the same value as the subsequent anchor token and moving to a next level of the selected anchor token tree or, if the subsequent anchor token is a last anchor token in the given event log, setting the node in the current level of the selected anchor token tree as a leaf node corresponding to a parser for the given event log.

8. The method of claim 1 wherein utilizing the ordered list of the anchor tokens of the incoming event log to traverse through the set of anchor token trees comprises:
   matching a first anchor token in the ordered list of anchor tokens of the incoming event log to the given root node of the given anchor token tree; and
   matching, in order, subsequent tokens in the ordered list of anchor tokens of the incoming event log along a branch of the given anchor token tree until a last anchor token in the ordered list of anchor tokens matches the given leaf node of the given anchor token tree.

9. The method of claim 1 wherein utilizing the ordered list of the anchor tokens of the incoming event log to traverse through the set of anchor token trees comprises failing to identify a root node of any of the set of anchor token trees matching a first anchor token in the ordered list of anchor tokens of the incoming event log.

10. The method of claim 9 further comprising:
    selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and creating a new anchor token tree comprising a new root node and a path from the new root node to a new leaf node corresponding to the given parser.

11. The method of claim 1 wherein utilizing the ordered list of the anchor tokens of the incoming event log to traverse through the set of anchor token trees comprises identifying the given root node matching a first anchor token in the ordered list of anchor tokens of the incoming event log but failing to identify a leaf node of the given anchor token tree corresponding to a last anchor token in the ordered list of anchor tokens of incoming event log.

12. The method of claim 11 further comprising:
selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and
creating a new branch of the given anchor token tree comprising a path from the given root node to a new leaf node corresponding to the given parser.

13. A computer program product comprising a non-transitory processor-readable storage medium having stored therein program code of one or more software programs, wherein the program code when executed by at least one processing device causes the at least one processing device:
to obtain an incoming event log associated with one or more of a plurality of assets in an enterprise system;
to split the incoming event log into a set of tokens;
to identify a subset of the set of tokens of the incoming event log as anchor tokens;
to utilize an ordered list of the anchor tokens of the incoming event log to traverse through a set of anchor token trees;
responsive to identifying a path from (i) a root node of a given one of the anchor token trees to (ii) a given leaf node of the given anchor token tree corresponding to the ordered list of the anchor tokens of the incoming event log, to select a given parser associated with the given leaf node of the given anchor token tree;
to extract data from the incoming event log utilizing the given parser;
to detect one or more security threats affecting at least one of the plurality of assets in the enterprise system based at least in part on the extracted data; and
to apply at least one remediation action to one or more of the plurality of assets in the enterprise system to mitigate at least one of the detected security threats.

14. The computer program product of claim 13 wherein utilizing the ordered list of the anchor tokens of the incoming event log to traverse through the set of anchor token trees comprises:
matching a first anchor token in the ordered list of anchor tokens of the incoming event log to the given root node of the given anchor token tree; and
matching, in order, subsequent tokens in the ordered list of anchor tokens of the incoming event log along a branch of the given anchor token tree until a last anchor token in the ordered list of anchor tokens matches the given leaf node of the given anchor token tree.

15. The computer program product of claim 13 wherein utilizing the ordered list of the anchor tokens of the incoming event log to traverse through the set of anchor token trees comprises:

failing to identify a root node of any of the set of anchor token trees matching a first anchor token in the ordered list of anchor tokens of the incoming event log;
selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and
creating a new anchor token tree comprising a new root node and a path from the new root node to a new leaf node corresponding to the given parser.

16. The computer program product of claim 13 wherein utilizing the ordered list of the anchor tokens of the incoming event log to traverse through the set of anchor token trees comprises:
identifying the given root node matching a first anchor token in the ordered list of anchor tokens of the incoming event log but failing to identify a leaf node of the given anchor token tree corresponding to a last anchor token in the ordered list of anchor tokens of incoming event log;
selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and
creating a new branch of the given anchor token tree comprising a path from the given root node to a new leaf node corresponding to the given parser.

17. An apparatus comprising:
at least one processing device comprising a processor coupled to a memory;
the at least one processing device being configured:
to obtain an incoming event log associated with one or more of a plurality of assets in an enterprise system;
to split the incoming event log into a set of tokens;
to identify a subset of the set of tokens of the incoming event log as anchor tokens;
to utilize an ordered list of the anchor tokens of the incoming event log to traverse through a set of anchor token trees;
responsive to identifying a path from (i) a root node of a given one of the anchor token trees to (ii) a given leaf node of the given anchor token tree corresponding to the ordered list of the anchor tokens of the incoming event log, to select a given parser associated with the given leaf node of the given anchor token tree;
to extract data from the incoming event log utilizing the given parser;
to detect one or more security threats affecting at least one of the plurality of assets in the enterprise system based at least in part on the extracted data; and
to apply at least one remediation action to one or more of the plurality of assets in the enterprise system to mitigate at least one of the identified security threats.

18. The apparatus of claim 17 wherein utilizing the ordered list of the anchor tokens of the incoming event log to traverse through the set of anchor token trees comprises:
matching a first anchor token in the ordered list of anchor tokens of the incoming event log to the given root node of the given anchor token tree; and matching, in order, subsequent tokens in the ordered list of anchor tokens of the incoming event log along a branch of the given anchor token tree until a last anchor token in the ordered list of anchor tokens matches the given leaf node of the given anchor token tree.

19. The apparatus of claim 17 wherein utilizing the ordered list of the anchor tokens of the incoming event log to traverse through the set of anchor token trees comprises:
   failing to identify a root node of any of the set of anchor token trees matching a first anchor token in the ordered list of anchor tokens of the incoming event log;
   selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and
   creating a new anchor token tree comprising a new root node and a path from the new root node to a new leaf node corresponding to the given parser.

20. The apparatus of claim 17 wherein utilizing the ordered list of the anchor tokens of the incoming event log to traverse through the set of anchor token trees comprises:
   identifying the given root node matching a first anchor token in the ordered list of anchor tokens of the incoming event log but failing to identify a leaf node of the given anchor token tree corresponding to a last anchor token in the ordered list of anchor tokens of incoming event log;
   selecting the given parser by comparing the incoming event log against a plurality of available parsers not represented by a path from a root node to a leaf node of one of the set of available anchor token trees until a match is found between the set of tokens of the incoming event log and a pattern of one of the plurality of parsers; and
   creating a new branch of the given anchor token tree comprising a path from the given root node to a new leaf node corresponding to the given parser.

* * * * *